UNITED STATES PATENT OFFICE.

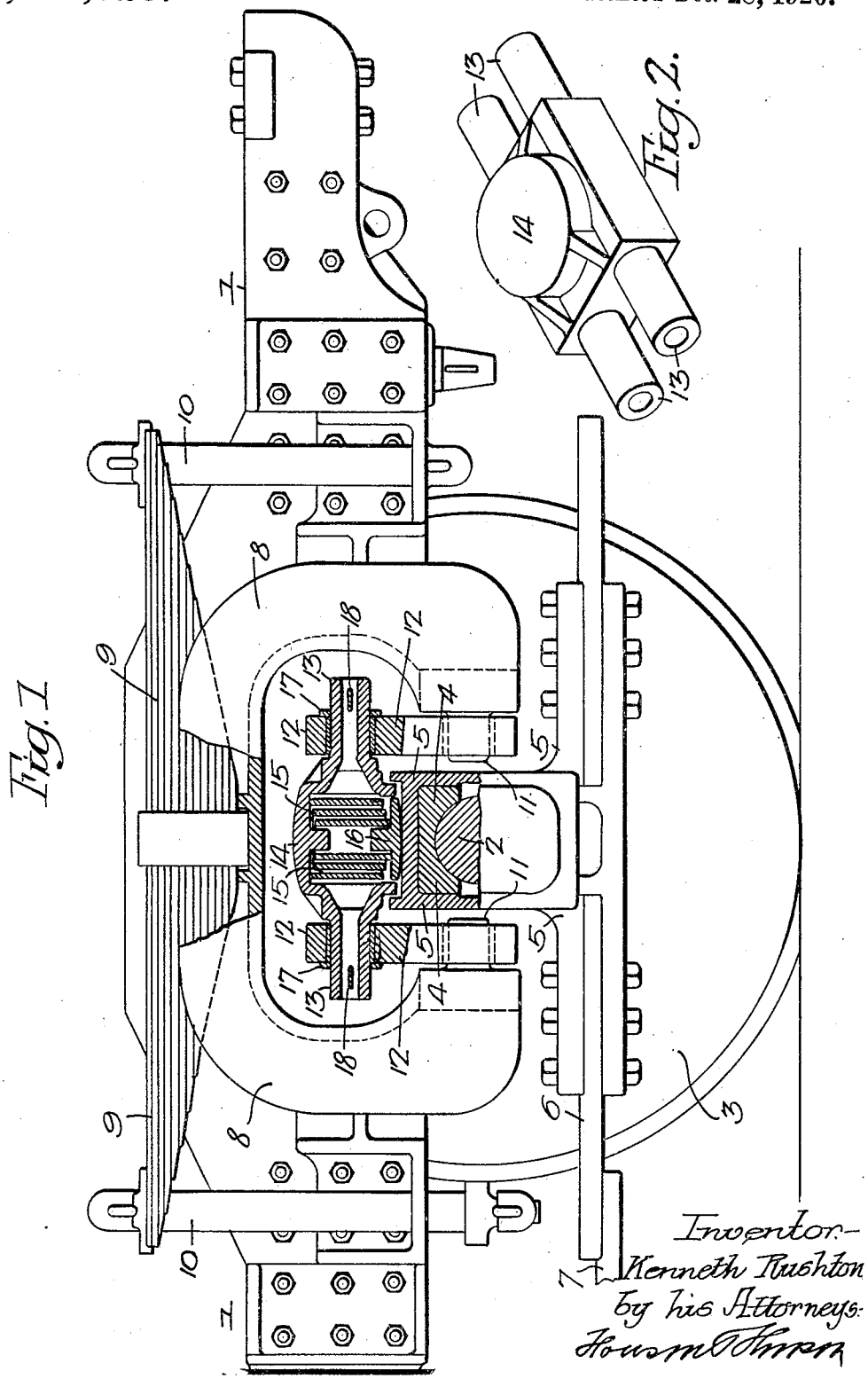

KENNETH RUSHTON, OF PHILADELPHIA, PENNSYLVANIA, ASSIGNOR TO THE BALDWIN LOCOMOTIVE WORKS, OF PHILADELPHIA, PENNSYLVANIA, A CORPORATION OF PENNSYLVANIA.

SWING-TRUCK FOR LOCOMOTIVES.

1,363,923.   Specification of Letters Patent.   Patented Dec. 28, 1920.

Application filed September 25, 1920. Serial No. 412,746.

*To all whom it may concern:*

Be it known that I, KENNETH RUSHTON, a citizen of the United States, residing in Philadelphia, Pennsylvania, have invented certain Improvements in Swing-Trucks for Locomotives, of which the following is a specification.

The object of my invention is to provide the side bearings of swing trucks with buffers, which relieve the parts of the truck from jars.

In the prior construction of trucks of this type, there was considerable distance between the bolster and the springs; therefore, the elements between these two parts were subjected to considerable strains and consequent wear.

In the accompanying drawings:

Figure 1 is a side view of sufficient of a swing truck of a locomotive to illustrate my invention; and Fig. 2 is a detached perspective view of the buffer spring carrier.

1 is the frame of a locomotive. 2 is an axle. 3 is one of the wheels, which is mounted on the axle. 4 is the axle box mounted in a bearing 5 secured to the frame 6 connected to a pivot bar 7 forming the swing truck. This bar is pivoted on the center line of the locomotive some distance in advance of the axle. 8 is a yoke. 9 is a spring located above the yoke and bearing upon the yoke at the center. The outer ends of this spring are connected to the frame by links 10. The yoke has pivot pins 11 and links 12 connect these pivot pins with the trunnions 13 of a buffer spring carrier 14, shown in Fig. 2. The buffer spring carrier is hollow, as shown, and mounted therein is a helical spring 15, which rests upon a shoe 16 mounted on the bearing 5 carrying the axle box 4. Mounted on the trunnions 13 are washers 17 and back of the washers are keys 18, but it will be understood that other fastenings may be used without departing from the essential features of the invention.

The invention is an improvement on the patent granted to me for rear swing trucks for locomotives, dated August 4, 1908, No. 895,204.

It will be understood that the construction hereinbefore described is duplicated on the opposite side of the locomotive and that the buffers are located close to the bearings of the axles so as to relieve the main parts of the structure from jars. This is accomplished without interfering with the free movement of the main springs 9.

I claim:

1. The combination in a swing truck for locomotives, of a pivoted frame carrying bearings; an axle mounted in the bearings; a frame of a locomotive; a yoke at each side of the frame; springs located between the frame and the yokes; and a buffer spring located between each yoke and the bearing for the axle.

2. The combination in a swing truck for locomotives, of a main frame; a bearing frame pivoted to the main frame; an axle mounted in the bearing frame; a buffer spring carrier mounted above each side of the bearing frame; a helical spring located within each carrier and resting upon the bearing frame; a yoke at each side of the main frame; links connecting each yoke with its carrier; springs above the yoke; and means connecting said springs with the frame.

3. The combination in a swing truck for locomotives, of a main frame; a yoke at each side of the main frame; a spring mounted on each yoke; links connecting the ends of the springs with the frame; pins on the yoke; a bearing frame pivoted to the main frame; an axle on the bearing frame; a buffer spring carrier located above each side of the pivoted bearing frame and having trunnions; links connecting the trunnions with the pin on the yokes; a spring mounted in each carrier; and a shoe under each carrier resting on the bearing frame and supporting a buffer spring.

KENNETH RUSHTON.